May 10, 1932.  F. W. BROOKS, SR  1,857,585
ICE AUGER
Filed April 17, 1931   2 Sheets-Sheet 1
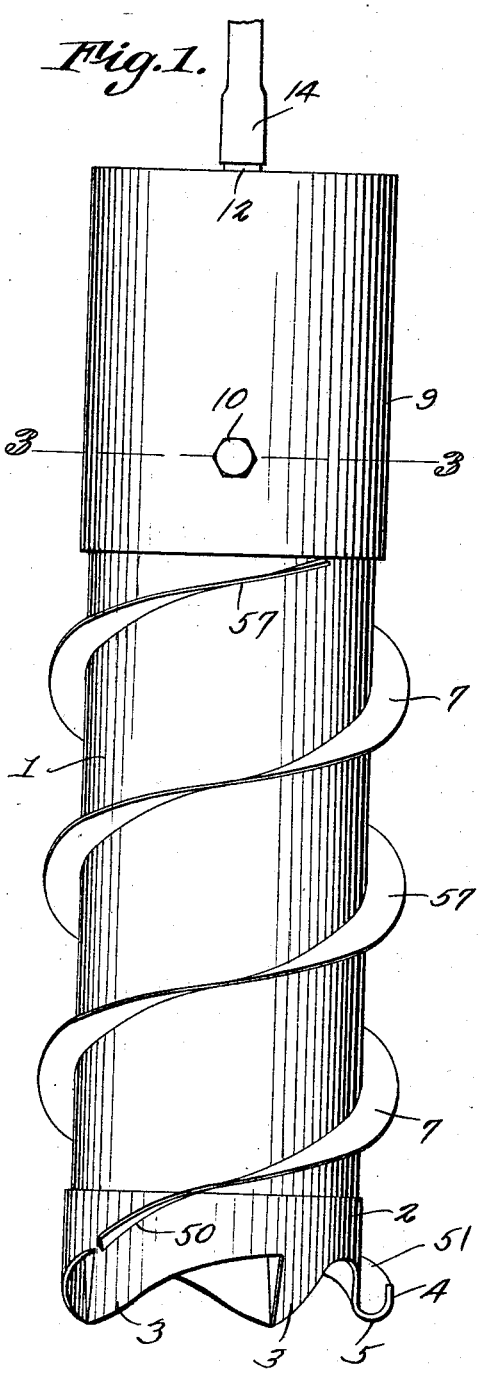
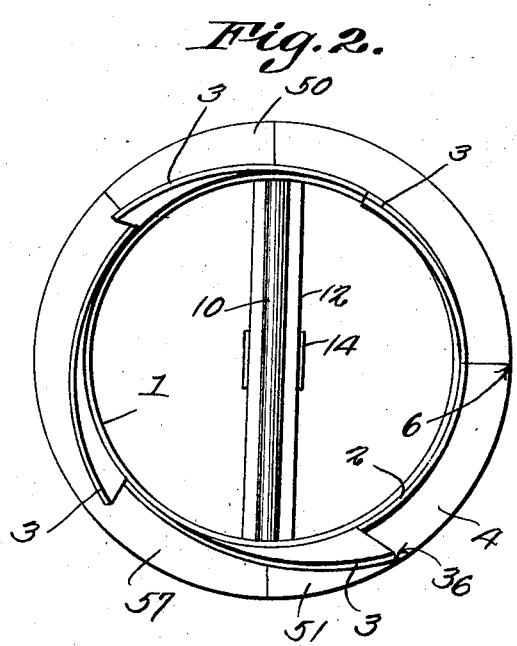
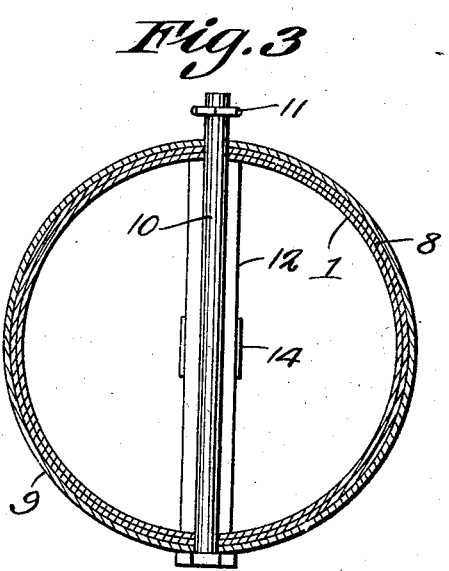
Inventor
F. W. Brooks, Sr.
By C. A. Snow & Co.
Attorneys.

May 10, 1932. F. W. BROOKS, SR 1,857,585
ICE AUGER
Filed April 17, 1931   2 Sheets-Sheet 2

Inventor
F. W. Brooks, Sr.
By C A Snow & Co.
Attorneys.

Patented May 10, 1932

1,857,585

UNITED STATES PATENT OFFICE

FREDERICK W. BROOKS, SR., OF VIRGINIA, MINNESOTA

ICE AUGER

Application filed April 17, 1931. Serial No. 530,983.

The device forming the subject matter of this application is adapted to be employed for boring fishing holes in the ice. In view of the fact that a fishing hole in the ice must be smooth, in order not to fray the fishing line, more is involved than simply making a hole of any kind in the ice, and the tool must be considered, not merely with respect to the hole that is bored, but, as well, with respect to the fishing line, when the line is in use in the hole. Moreover, tools of the kind mentioned generally are operated by hand and not by power, because no power is available on the ice, and, therefore, the present tool is so constructed that it will bore a hole with a minimum expenditure of power.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in side elevation, a tool constructed in accordance with the invention;

Figure 2 is an end elevation;

Figure 3 is a transverse section taken approximately on the line 3—3 of Figure 1;

The device forming the subject matter of this application preferably is made of metal throughout. It comprises a tubular body, including a cylinder 1. About the lower end of the cylinder 1, a reenforcing collar 2 is secured. Because the collar 2 is used, the cylinder 1 may be made lighter than would be the case otherwise, and the entire device, therefore, may be rotated without the expenditure of great power, a consideration which is of importance in connection with a tool, which, ordinarily, is turned by hand.

The collar 2 is provided at its lower end with depending pointed teeth 3 which slant outwardly at progressively increasing angles. The collar 2 has short spiral ribs 50 and 51, which are oppositely disposed.

Figure 4:
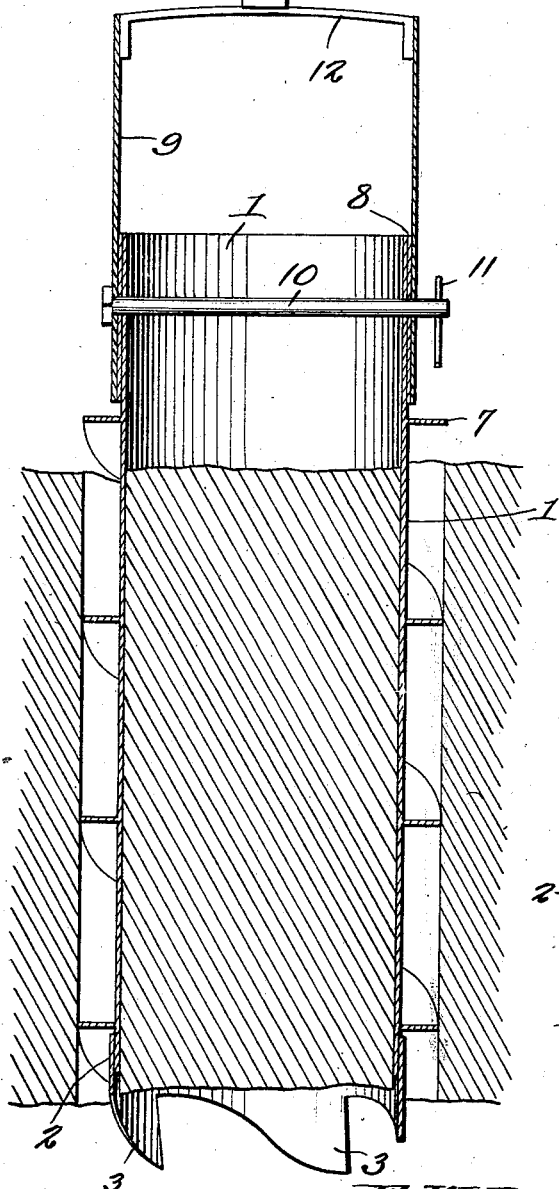
Figure 4 is a longitudinal section.
Figure 5:
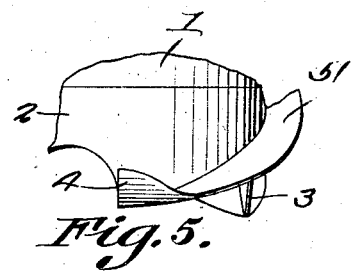
Figure 5 is a fragmental side elevation.

The collar 2 is provided at its lower end with a circumferentially-extended, upwardly-opening, outwardly-extended, trough-shaped reamer 4, which is located immediately in advance of the tooth which has the most pronounced outward slant, an observation which will be understood readily when Figure 2 of the drawings is noted. The reamer is located at the lower end of the spiral rib 51, as Figure 5 will show. The tool is further characterized by the fact that the bottom 5 of the reamer 4 is disposed higher than the lower ends of the teeth 3, as shown in Figure 1. Noting the point at which the reference numeral 36 is applied in Figure 2, it will be seen that the reamer 4 extends laterally and outwardly beyond the circle in which operates the tooth which has the most pronounced outward slant.

The cylinder 1 is provided with spiral ribs 7 and 57, the rib 50 on the ring 2 forming a continuation of the rib 7 on the cylinder, and the rib 51 on the ring forming a continuation of the rib 57 on the cylinder. As shown at 6 in Figure 2, the reamer 4 extends outwardly to the outer edge of the rib 51—57. The general construction shown at 3—4—36—6 is such that a smooth hole will be bored in the ice, the vertical outer wall of the reamer 4 finishing the hole, beyond the tooth 3 which has the most pronounced outward slant, a clear space being made underneath the ribs 7—50 and 57—51, the rib 57—51 taking the loosened ice from the reamer 4, and carrying it upwardly, when the body of the tool is rotated, the reamer being at least as wide as the area cut by the teeth 3, and at least as wide as the ribs.

The tool may be rotated in any desired way. About the upper end of the cylinder 1 may be secured a reenforcing collar 8, disposed within a cylindrical extension 9, of any desired length. A headed securing element 10 passes removably through the upper end of the cylinder 1, through the collar 8, and through the lower end of the extension 9, and the securing element 10 may be held in place by its head, and by a cotter pin 11 mounted in the opposite end of the securing element. A bridge 12 is secured in the upper end of the extension 9, and carries a vertical shaft 14, which, being rotated either by hand, or by power, renders the tool operative for the purposes intended.

Having thus described the invention, what is claimed is:

1. A tool for making fishing holes in the ice, comprising a tubular body provided at its lower end with depending teeth which slant outwardly at progressively increasing angles, the body being supplied at its lower end with a circumferentially-extended, upwardly-opening, outwardly-extended, trough-shaped reamer, located immediately in advance of the tooth which has the most pronounced outward slant.

2. A tool for making fishing holes in the ice, constructed as set forth in claim 1, and further characterized by the fact that the bottom of the reamer is disposed higher than the lower ends of the teeth, the reamer extending laterally and outwardly beyond the circle in which said tooth moves.

3. A tool for making fishing holes in the ice, comprising a tubular body provided at its lower end with depending teeth which slant outwardly at progressively increasing angles, the body being supplied at its lower end with a circumferentially-extended, upwardly-opening, outwardly-extended, trough-shaped reamer, the body being provided with a spiral rib located above the teeth and leading from the reamer, the reamer being at least as wide as the area cut by the teeth, and at least as wide as the rib.

In testimony that I claim the foregoing as my own, I have hereto affixed my signature.

FREDERICK WM. BROOKS, Sr.